(12) United States Patent
Payne et al.

(10) Patent No.: US 6,498,669 B1
(45) Date of Patent: ***Dec. 24, 2002

(54) OPTICAL PULSE PROPAGATION

(75) Inventors: David Neil Payne; Anatoly Grudinin, both of Southampton (GB); Igor Andreevich Goncharenko, Hagen (DE)

(73) Assignee: University of Southampton, Hampshire (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,667

(22) PCT Filed: Sep. 10, 1996

(86) PCT No.: PCT/GB96/02225
§ 371 (c)(1),
(2), (4) Date: Jun. 1, 1998

(87) PCT Pub. No.: WO97/10652
PCT Pub. Date: Mar. 20, 1997

(30) Foreign Application Priority Data

Sep. 11, 1995 (GB) ............................................. 9518524
Jul. 15, 1996 (GB) ............................................. 9614830

(51) Int. Cl.[7] .............................................. H04B 10/00

(52) U.S. Cl. ........................ 359/161; 359/188; 359/179

(58) Field of Search ................................ 359/160–161, 359/173, 188, 179

(56) References Cited

U.S. PATENT DOCUMENTS

| | | | | |
|---|---|---|---|---|
| 5,035,481 A | * | 7/1991 | Mollenauer | 359/188 |
| 5,140,656 A | | 8/1992 | Hasegawa et al. | 385/24 |
| 5,357,364 A | * | 10/1994 | Gordon et al. | 359/173 |
| 5,502,588 A | * | 3/1996 | Abram | 359/188 |
| 5,570,438 A | * | 10/1996 | Fontana et al. | 359/188 |
| 5,629,795 A | * | 5/1997 | Suzuki et al. | 359/161 |
| 5,966,228 A | * | 10/1999 | Akiba et al. | 359/172 |

FOREIGN PATENT DOCUMENTS

| | | |
|---|---|---|
| GB | 2 161 612 | 7/1984 |
| GB | 2 254 183 A | 9/1992 |
| GB | 2 271 236 A | 4/1994 |
| GB | 2 277 651 A | 11/1994 |
| WO | 96/31024 | 10/1996 |

OTHER PUBLICATIONS

Veluppillai Chandrakumar et al., "Combination of In–Line Filtering and Receiver Dispersion Compensation for an Optimized Soliton Transmission", Journal of Lightwave Technology, vol. 12, No. 6, Jun. 1994, pp. 1047–1051.

Naoya Henmi et al., "An Arrangement of Transmission–Fiber Dispersions for Increasing the Spacing Between Optical Amplifiers in Lumped Repeater Systems", IEEE Photonics Technology Letters, vol. 5, No. 11, Nov. 1993, pp. 1337–1340.

Paulo Akihumi Yazaki et al., "Chirping Compensation Using a Two–Section Semiconductor Laser Amplifier", Journal of Lightwave Technology, vol. 10, No. 9, Sep. 1992, pp. 1247–1254.

(List continued on next page.)

*Primary Examiner*—Kinfe-Michael Negash
(74) *Attorney, Agent, or Firm*—Renner, Otto, Boisselle & Sklar, LLP

(57) ABSTRACT

A method of optical pulse propagation via a dispersive optical fibre, the method comprising the steps of: launching the optical pulses into the fibre at a pulse intensity sufficient to provide non-linear dispersion compensation during propagation through a first portion of the fibre; and providing a counter-chirping device to substantially compensate for the dispersion of a remaining, second portion of the fibre.

28 Claims, 9 Drawing Sheets

OTHER PUBLICATIONS

Ruo–Ding Li et al., "Dispersion Compensation With Phase–Sensitive Optical Amplifiers", Journal of Lightwave Technology, vol. 12, No. 3, Mar. 1994, pp. 541–549.

A.B. Grudinin et al., "Reduction of Soliton Instability in Transmission Systems by Means of Chirped Bandwidth–Limited Amplification", Proceeding of $21^{st}$ European Conference on Optical Communication, vol. 1, 17–21, Sep. 1995, pp. 295–298.

Matsumoto et al., "Adiabatic amplification of solitons by means of nonlinear amplifying loop mirrors", Optics Letters, vol. 19, No. 14, Jul. 15, 1994. pp. 1019–1021.*

H. Kubota et al., "Soliton Transmission Control in Time and Frequency Domains", IEEE Journal of Quantum Electronics, vol. 29, No. 7, Jul. 1993, pp. 2189–2195.

T. Widdowson et al., "20Gbit/s soliton transmission over 125 Mm", Electronics Letters, vol. 30, No. 22, Oct. 27, 1994, pp. 1866–1868.

L.F. Mollenauer et al., "The sliding–frequency guiding filter: an improved from of soliton jitter control", Optics Letters, vol. 17, No. 22, Nov. 15, 1992, pp. 1575–1577.

M. Matsumoto et al., "Numeric study of the reduction of instability in bandwidth–limited amplified soliton transmission", Optics Letters, vol. 18, No. 11, Jun. 1, 1993, pp. 897–899.

D. Atkinson et al., "Increased amplifier spacing in a soliton system with quantum–well saturable absorbers and spectral filtering", Optics Letters, vol. 19, No. 19, Oct. 1, 1994, pp. 1514–1516.

K.J. Blow et al., "The asymptotic dispersion of soliton pulses in lossy fibres", Optics Communications, vol. 52, No. 5, Jan. 1, 1985, pp. 367–370.

C. Desem et al., "Effect of chirping on soliton propagation in single–mode optical fibers", Optics Letters, vol. 11, No. 4, Apr. 1986, pp. 248–250.

M. Suzuki et al., "Timing jitter reduction by periodic dispersion compensation in soliton transmission", OFC'95, paper PD20–1, 1995, pp. 401–405.

N. Edagawa et al., "20Gbit/s, 8100Km Straight–Line Single–Channel Soliton–Based RZ Transmission Experiment Using Periodic Dispersion Compensation", ECOC'95, paper TH.A3.5, 1995, pp. 983–987.

N.J. Smith et al., "Enhanced power solitons in optical fibres with periodic dispersion management", Electronics Letters, vol. 32, No. 1, Jan. 4, 1996, pp. 54–55.

A. Mecozzi, "Long–distance soliton transmission with filtering", Optical Society of America, vol. 10, No. 12, Dec. 1993, pp. 2321–2330.

A. Mecozzi, "Soliton transmission control by Butterworth filters", Optics Letters, vol. 20, No. 18, Sep. 15, 1995, pp. 1859–1861.

D. Marcuse, "An Alternative Derivation of the Gordon–Haus Effect", Journal of Lightwave Technology, vol. 10, No. 2, Feb. 1992, pp. 273–277.

* cited by examiner

OPTICAL PULSE PROPAGATION

This invention relates to optical pulse propagation.

BACKGROUND OF THE INVENTION

Group velocity dispersion (GVD) is the main phenomenon restricting the maximum useable bit rate of optical fibre transmission systems. When a short pulse propagates down the fibre, different spectral components of the pulse travel with different velocities (due to GVD) which results in pulse broadening.

Considering a spectral region in which "blue" (shorter wavelength) components propagate faster then "red" (longer wavelength) ones (and such a situation occurs for wavelengths longer than 1300 nm in conventional non-dispersion-shifted single mode fibres) then the leading edge of the pulse contains the shorter-wavelength spectral components while longer ones are found on the tailing edge of the pulse. In other words, the instantaneous frequency varies across the pulse and the pulse becomes "chirped".

Pulse broadening $\Delta\tau$ can be expressed in the form $$\Delta\tau = Dz\delta\lambda,$$

where D is the chromatic dispersion in ps/nm·km, z is the length of the fibre and $\delta\lambda$ is the spectral width of the pulse. It is this pulse broadening effect which limits the maximum pulse repetition frequency in a transmission system.

One acknowledged way of minimizing or reducing the pulse broadening is the use of dispersion-shifted fibres with parameter D close to zero. Another way to reach high bit-rates is to compensate for group velocity dispersion (instead of attempting to minimize it) using the nonlinear properties of the glass from which the fibre is made (usually doped silica).

It is known that the refractive index of silica glass can be expressed as a combination of linear and nonlinear components. The latter can be written in the form $$n_{n1} = n_2 I,$$

where $n_2$ is the so-called nonlinear refractive index (which in silica glass is equal to $2.6 \cdot 10^{-16} cm^2/W$) and I is the intensity of the light. The nonlinear part of the refractive index causes a phase change $$\phi_{n1} = kn_2 Iz = 2\pi n_2 Iz/\lambda,$$

(where $\lambda$ is the wavelength) and if the light intensity I depends on time (as found in a pulse of light) then the refractive index nonlinearity results in a variation of the instantaneous frequency across the pulse. Indeed, the pulse phase can be written in the form $$\phi = \omega_0 t - \phi_1 - \phi_{n1} = \omega_0 t - knz - kn_2 I(t)z,$$

where $\omega_0$ is the pulse central frequency and $\phi_1$ is a linear phase shift. The first derivative of the pulse phase is the pulse instantaneous frequency $$d\phi/dt = \omega = \omega_0 - kn_2 z\, dI(t)/dt.$$

Thus the refractive index nonlinearity results in a pulse chirp with opposite sign to the dispersion-induced chirp (assuming fibre dispersion in the region longer than 1300 nm to be positive). A physical interpretation is that the fibre nonlinearity causes the red components of the pulse spectrum to travel faster than the blue ones and this effect can be used to compensate dispersion-induced pulse broadening.

It is clear that in order to cancel dispersion broadening of the pulse using refractive index non-linearity one needs a certain pulse intensity for a given pulse width $\tau_c$ and dispersion. Such pulses with dispersion broadening balanced by nonlinear compression are called solitons. Their intensity corresponds to the intensity of the so-called fundamental soliton $I_s$ and can be written in the form $$I_s = 0.322 \lambda^3 D/(4\pi^2 \tau_c^2)$$

Thus the lower the dispersion and the broader the pulse the less intensity one needs to compensate for dispersion-induced broadening.

Solitons have a number of interesting properties, but the most important (for practical applications) soliton properties are listed below. These will be referred to later as properties #1 to #7.

1. A soliton is a bandwidth-limited pulse with time-bandwidth product $\tau\Delta\nu = 0.315$, where $\Delta\nu = c\delta\lambda/\lambda^2$ is the soliton's spectral bandwidth.
2. The soliton's phase is constant across the pulse.
3. The soliton's temporal shape is $sech^2 t$ (where t is time).
4. The soliton's intensity and pulse width are related to each other, namely $$P\tau^2 = Const \cdot D.$$

(typically P=10 mW for $\tau$=5 ps and D=1 ps/nm·km)

5. After some distance of propagation a non-$sech^2 t$ pulse evolves into a soliton ($sech^2 t$) pulse and a non-soliton component.
6. A soliton accompanied by spurious radiation transforms into another soliton with modified parameters (central frequency, intensity, pulse width) and a nonsoliton component.
7. Two solitons closely situated in time interact with each other through overlapping optical fields. To avoid soliton interactions the separation time between solitons should exceed five times their pulsewidths.

When a soliton propagates down a fibre with loss then its intensity becomes less and, in accordance with soliton property #4, it becomes broader. When the soliton becomes broader it begins to interact with adjacent pulses which is not acceptable for transmission systems.

Another serious problem is associated with soliton property #5. During propagation in a lossy fibre the soliton remains an essentially nonlinear pulse for some distance which results in narrowing of its spectral bandwidth, but after that distance its intensity is insufficient for the compressive effect of the non-linear refractive index to adequately balance the fibre dispersion and the soliton experiences only temporal broadening without any significant changes in spectral bandwidth. This means that the original bandwidth-limited pulse becomes a chirped one. The longer the distance the soliton propagates the more it differs from the ideal $sech^2 t$-shape and therefore the bigger the fraction of non-soliton component in the propagating pulse. After amplification this non-soliton component is shed by the soliton according to soliton property #5. Physically the non-soliton component is a dispersive pulse which may propagate faster or slower than the soliton and can interact with the main pulse changing its parameters and even destroying it. The strength of this nonlinear coupling depends on the intensity of the non-soliton component and hence the more the soliton shape differs from the "ideal soliton" the stronger the non-soliton component affect the propagation of the main pulse.

The situation becomes much worse when a soliton propagates in a transmission system which normally comprises a chain of fibre links and optical amplifiers. At each stage the soliton emits the non-soliton component, and after several amplification stages the level of non-soliton component becomes so high that nonlinear coupling between the two fields causes the soliton to break-up.

Thus interaction between soliton pulses and the accompanying non-soliton component results in soliton instability. One previously proposed way of reducing this effect is to keep the amplifier spacing much shorter than the soliton dispersion length $z_d$, which is approximately equal to $\tau^2/D$. Doing so reduces the amount of the radiated non-soliton component at the expense of shortening the required amplifier spacing. The latter is expensive and is thus commercially undesirable.

For example, in standard telecom fibres with group velocity dispersion around 17 ps/nm·km the dispersion length is of the order of 0.5 km for 5 ps pulses and 40 km for 50 ps pulses and normally the amplifier spacing should be less than this distance. An improvement is obtained in dispersion-shifted fibre with typical dispersion 1 ps/nm·km, in which case the dispersion length and hence the appropriate amplifier spacing can be as long as 7 km for 5 ps pulses and 700 km for 50 ps pulses. Thus, practically speaking, the effect of soliton instability not only imposes a limitation on the pulsewidth and amplifier spacing but also dictates the use of dispersion-shifted fibres in soliton transmission systems.

There is another serious problem associated with soliton property #6. At each amplifier some small amount of background amplified spontaneous emission is added to the soliton. This noise causes random variations of the soliton parameters, including the soliton central frequency which translates into uncertainty in soliton arrival time, causing timing jitter.

In summary, nonlinear coupling between the soliton and the non-soliton component is a key parameter affecting soliton stability, and the best way to maintain stable soliton propagation in a system with reasonably long amplifier spacing is to reduce the amount of non-soliton component. For this reason a number of practical soliton transmission systems have proposed the use of so-called soliton transmission control techniques.

There are two main strategies in soliton transmission control. The prime target of the first one is to provide higher transmission loss for the non-soliton component than for the soliton which thus reduces the non-soliton component. Several methods have been proposed to minimise or reduce the non-soliton component.

In the first method (see publication reference 1 below, denoted as [1]) an amplitude modulator was timed to pass the solitons at the peak of its transmission. The pulses that were positioned off their assigned time slot were retimed. The main disadvantage of this scheme is the requirement to incorporate the extra modulator periodically along the length of the transmission system.

Another approach was demonstrated in [2] where the peak transmission frequencies of optical filters (so-called guiding filters) were gradually translated at each filter station along the fibre link. This makes the link substantially opaque to noise and transparent for solitons. The sliding frequency technique requires however a very precise set of optical filters which must be placed along the optical fibre link in the correct order.

A third previously proposed technique is the use of nonlinear gain (or loss). The main idea is to introduce additional losses for linear radiation relative to that experienced by the solitons using both filtering and a saturable absorber. If an excess linear gain at a fibre amplifier/saturable absorber combination is high enough to compensate the soliton loss experienced in the preceding fibre section, but not sufficient for the compensation of linear radiation loss then one can expect stable soliton propagation with a suppressed low-level non-soliton component. The main problem associated with this method is the finite recovery time of the saturable absorber.

Thus there is a need for an improved technique for stabilising optical soliton propagation along an optical fibre communication link. Such a technique could potentially allow higher bit rates and/or greater amplifier separations to be used.

SUMMARY OF THE INVENTION

This invention provides optical communication apparatus comprising:

a dispersive optical fibre link;

an optical transmitter for launching optical pulses into the optical fibre at a pulse intensity sufficient to provide non-linear dispersion compensation during propagation through a first length of the fibre;

a series of amplifier units spaced along the fibre by a distance greater than the first length of the fibre, each amplifier unit comprising a counter-chirping device for substantially compensating for the dispersion of a second portion of the fibre, being the difference between the first length and the amplifier spacing, and an amplifier for launching amplified optical pulses into the optical fibre at a pulse intensity sufficient to provide non-linear dispersion compensation during propagation through the first length of the fibre.

The invention provides a new hybrid technique for pulse propagation along an optical fibre. Initially, in a first portion of the fibre, the pulses launched into the fibre are sufficiently intense to provide non-linear dispersion compensation of the fibre dispersion. When in a second portion of the fibre, through fibre losses and pulse broadening, the pulse intensity is no longer sufficient to provide this effect, a counter-chirping device is provided to compensate for the dispersion of the second portion.

This hybrid linear/non-linear technique can advantageously increase the possible amplifier spacing in a transmission link.

The counter-chirping device can be attached anywhere along the second portion, but is preferably a part of an amplifier package at the output of the second portion.

It will be appreciated that the launching step could be carried by launching the pulses from an optical transmitter, another fibre, an amplifier and so on.

Embodiments of the invention addresses the problems of obtaining stable soliton propagation by controlling the amount of the non-soliton component. This technique will be referred to as chirped bandwidth-limited amplification (CBLA).

As mentioned above, when a soliton propagates in a fibre with loss its intensity becomes less and thus it becomes broader and transforms from a bandwidth-limited pulse to a chirped one. After amplification, a chirped nonlinear pulse tends to split into a fundamental soliton and a nonsoliton component and therefore after several amplification stages the fraction of non-soliton component becomes unacceptably high and causes the soliton to break-up. (It should be pointed out here that injecting a higher intensity pulse into the fibre in order to compensate for fibre losses and make use of the multisoliton compression effect to compensate for the soliton broadening is inefficient owing to the generation of an even hither level of the non-soliton component which again quickly destroys the soliton).

However if a counter-chirp is deliberately imposed over the soliton to compensate for the fibre dispersion-induced chirp then the soliton emits much less linear radiation and can propagate much longer distances without breaking up. Thus in embodiments of the invention, the use of chirped bandwidth-limited amplification results in stable soliton propagation.

The invention also provides a method of optical communication comprising:

launching optical pulses into a dispersive optical fibre link at a pulse intensity sufficient to provide non-linear dispersion compensation during propagation through a first length of the fibre; and providing a series of amplifier units spaced along the fibre by a distance greater than the first length of the fibre, each amplifier unit comprising a counter-chirping device for substantially compensating for the dispersion of a second portion of the fibre, being the difference between the first length and the amplifier spacing, and an amplifier for launching amplified optical pulses into the optical fibre at a pulse intensity sufficient to provide non-linear dispersion compensation during propagation through the first length of the fibre.

Other aspects and preferred features of the invention are defined in the appended claims. It will be appreciated that preferred features defined with respect to one aspect of the invention are applicable to other aspects of the invention.

BRIEF DESCRIPTION OF THE DRAWING

The invention will now be described by way of example with reference to the accompanying drawings, throughout which like parts are referred to by like references, and in which:

FIG. 3b is a schematic graph illustrating the break-up of solitons passing through the chain of FIG. 3a;

DETAILED DESCRIPTION

Figure 1A:
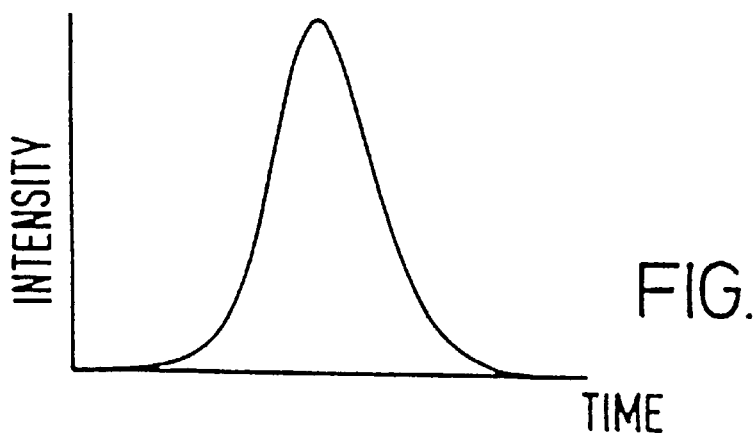
FIGS. 1a to 1c are schematic graphs illustrating the phenomena of group velocity dispersion and nonlinearity.
Figure 1B:
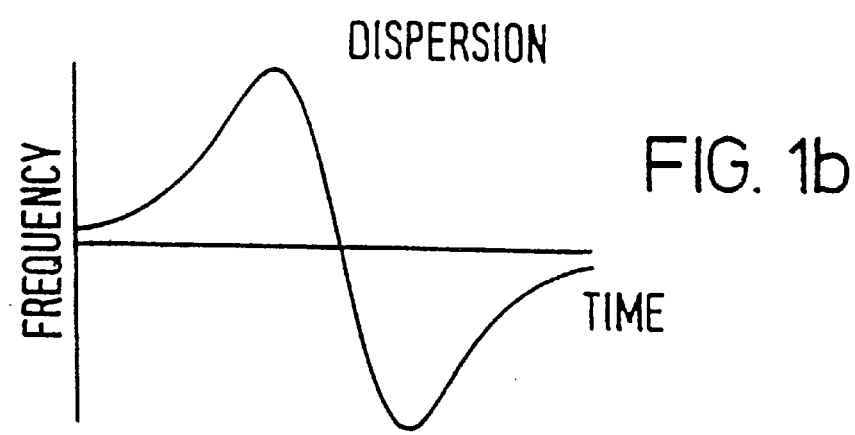
Figure 1C:
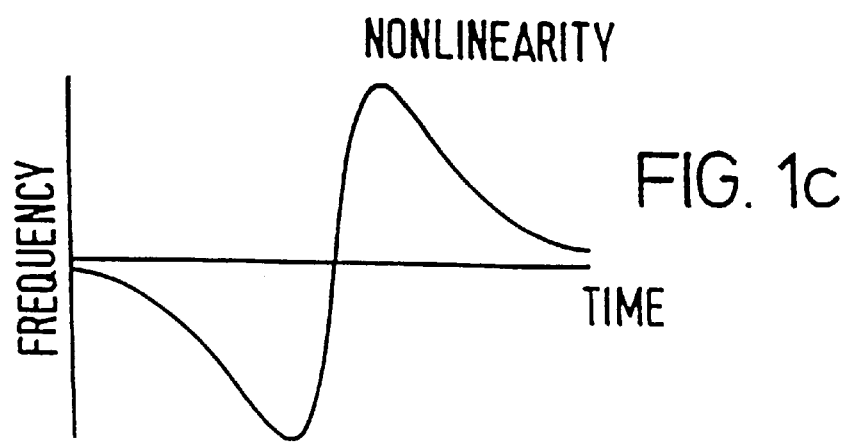

FIGS. 1a to 1c are schematic graphs illustrating the phenomena of group velocity dispersion and nonlinearity described in the introduction. In particular, FIG. 1a illustrates the time-dependent intensity of a pulse transmitted via an optical fibre link; FIG. 1b illustrates a chirp induced by GVD; and FIG. 1c illustrates a substantially opposite chirp induced by fibre nonlinearity.

Figure 2A:
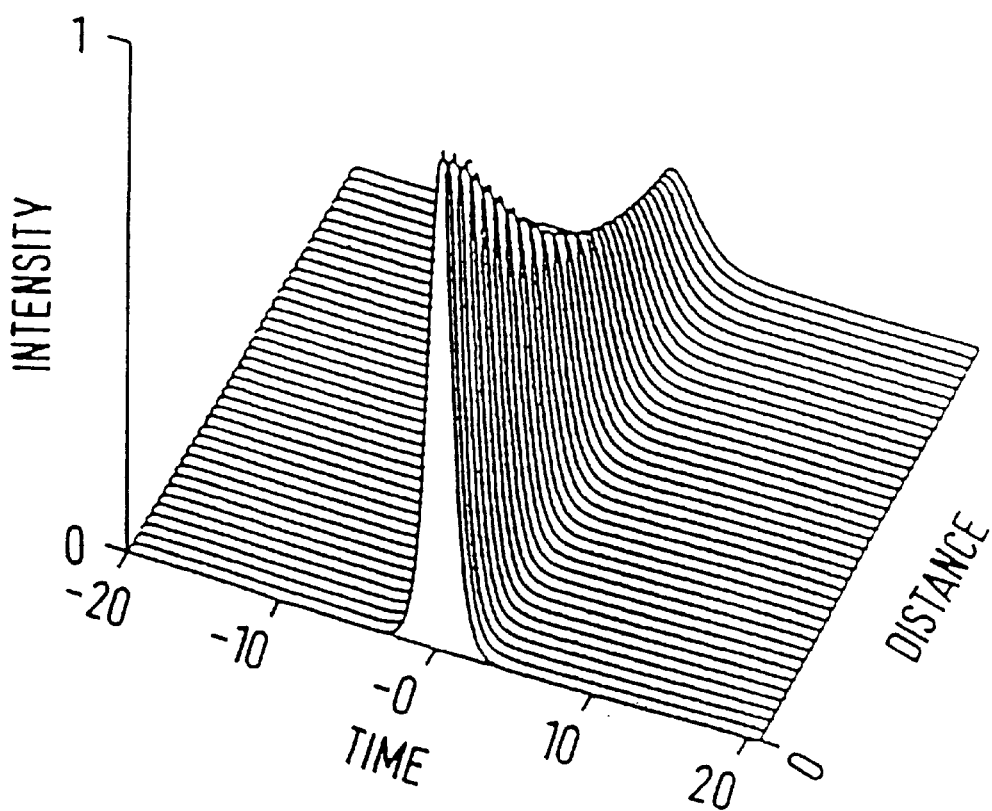
FIGS. 2a and 2b are schematic graphs illustrating soliton broadening caused by fibre loss.
Figure 2B:
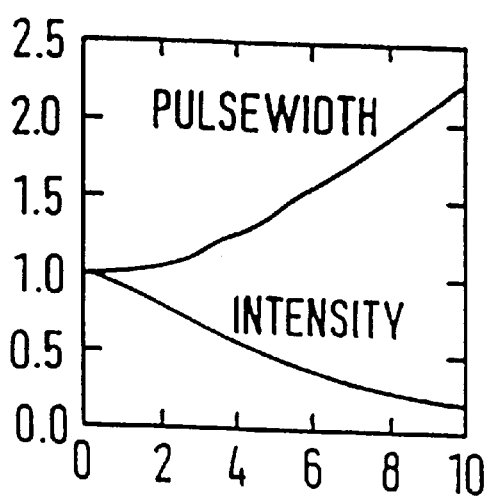

FIGS. 2a and 2b are schematic graphs illustrating soliton broadening caused by fibre loss. Both of these Figures show that the peak intensity of a soliton pulse diminishes, and the pulsewidth increases, with distance propagated. Time is in units normalised to soliton pulsewidths; distance is in arbitrary units.

Figure 3A:
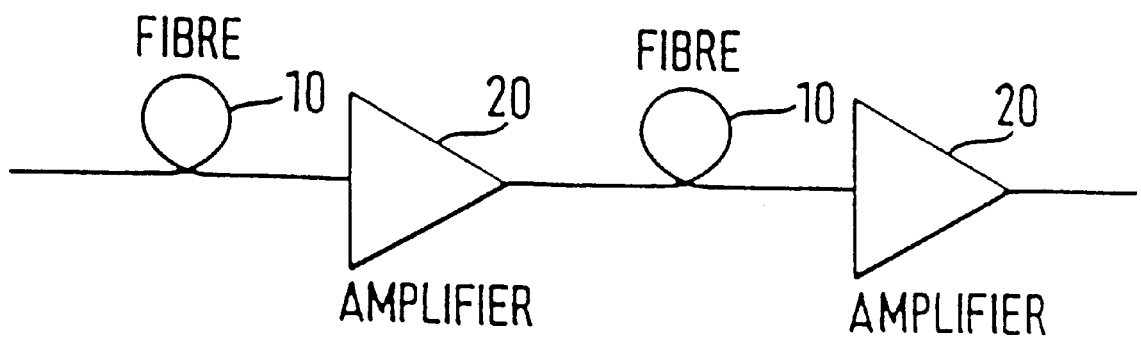
FIG. 3a is a schematic diagram of a chain of fibre links and conventional amplifiers.
Figure 3B:
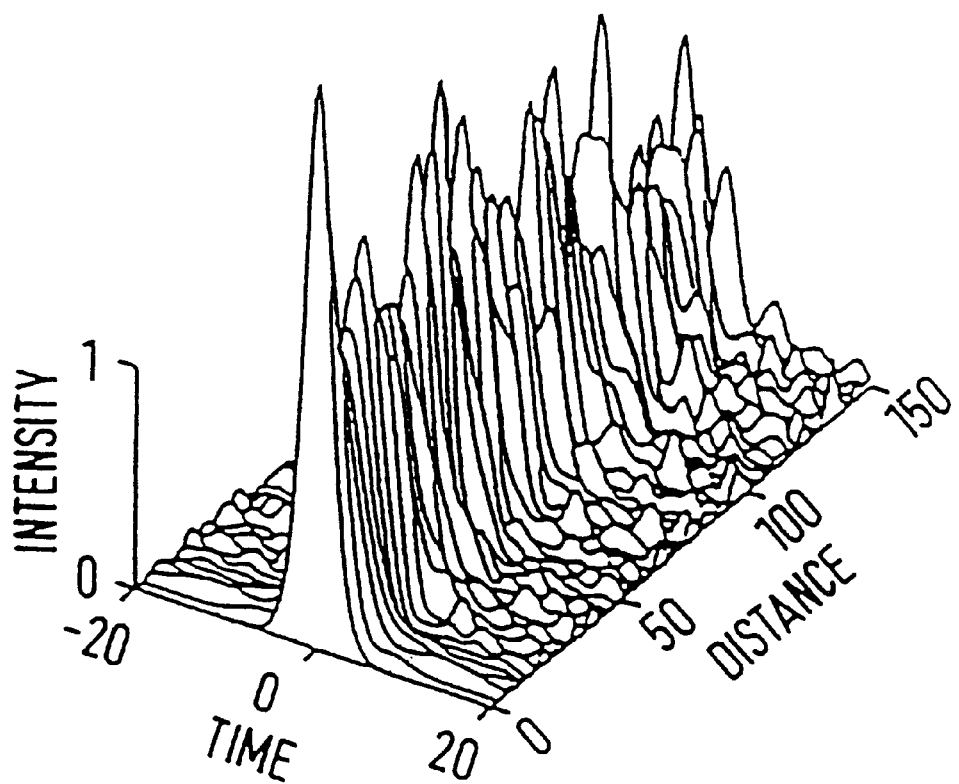

FIG. 3a is a schematic diagram of a chain of fibre links 10 and conventional amplifiers 20 as described in the introduction. FIG. 3b is a schematic graph illustrating the break-up of solitons passing through such a chain. Time is in units normalised to soliton pulsewidths; distance is in units normalised to the fibre dispersion length.

Figure 4:
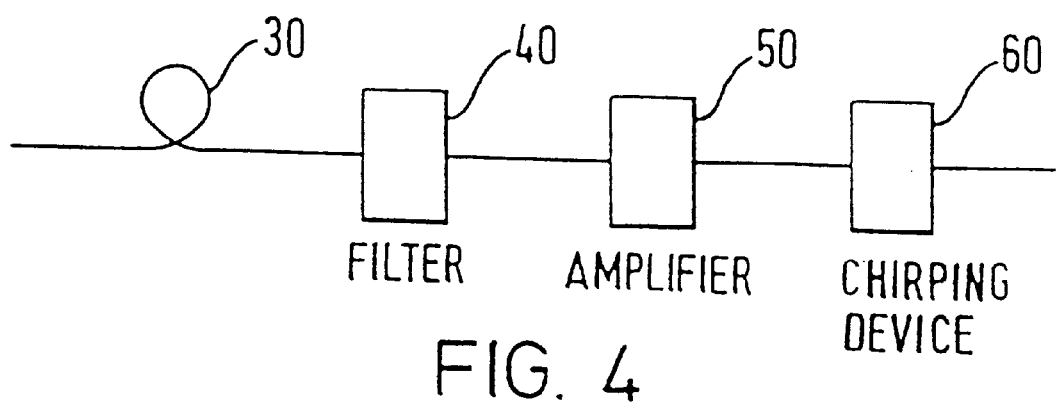
FIG. 4 is a schematic diagram of an optical transmission system.

FIG. 4 is a schematic diagram of an optical transmission system according to an embodiment of the invention. To demonstrate the method of soliton control using CBLAs the transmission system depicted in FIG. 4 will now be described using simulation models.

In FIG. 4, the system comprises a length of optical fibre 30, a bandpass optical filter 40 with amplitude transmission function $H(\omega)=(1+2i\omega B)^{-1}$, where $\omega$ is the optical frequency relative to the pulse central frequency and B is the filter optical bandwidth, an optical amplifier 50 and a chirping device 60.

Propagation in the fibre 30 was modelled using the split-step Fourier method to solve the Nonlinear Schrodinger Equation. For the chirping device a model was used which transforms the incoming pulse according to $A(\omega) \rightarrow A(\omega)\exp(i\alpha\omega^2)$ where $\alpha$ is a dimensionless quantity indicative of the chirp strength. The filter spectral bandwidth chosen was four times wider than the soliton bandwidth.

Modelling was carried out with and without the filter 40 and the chirping device 60, to demonstrate the benefits of using embodiments of the present invention.

Figure 5A:
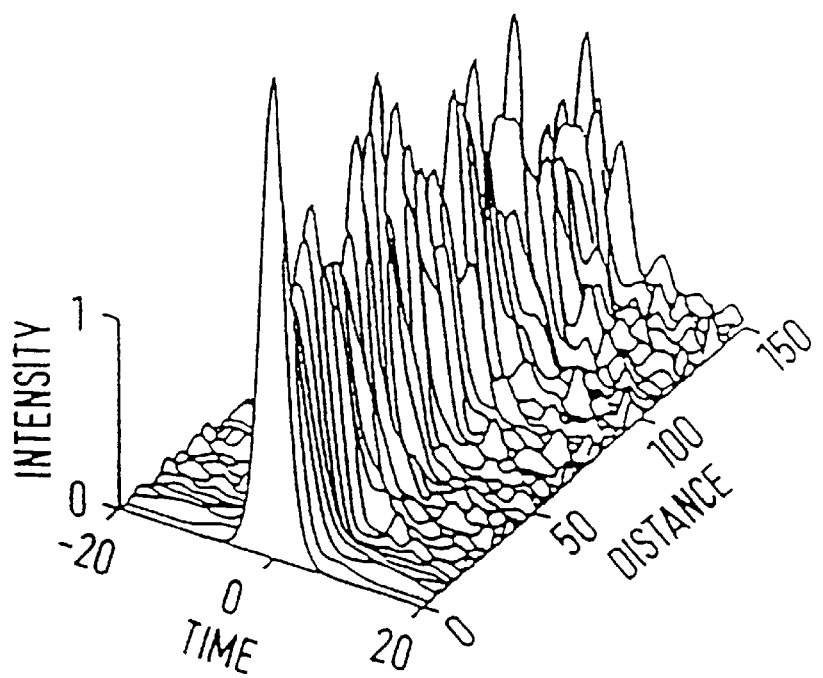
FIGS. 5a and 5b are schematic diagrams illustrating soliton propagation respectively without and with CBLA.

FIG. 5a shows soliton propagation in the absence of both spectral filtering and counter-chirping. The soliton is unstable and breaks up after several stages of amplification.

Figure 5B:
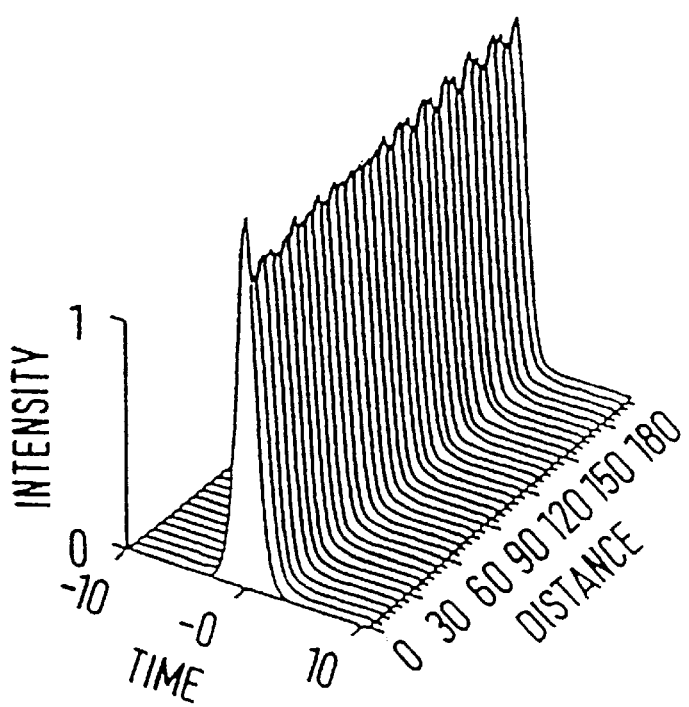

In a system with CBLA (FIG. 5b) the soliton is much more stable and is capable of propagating over 10 000 km in dispersion-shifted fibre without any significant degradation. The loss between amplifiers is 10 dB and the amplifier spacing is equal to 3 dispersion lengths. The additional gain due to the filter is 0.2 dB and the optimal chirp strength parameter $\alpha=0.6$ or, in physical units, 4 $ps^2$ for 5 ps pulses.

The effect of chirping results in pulsewidth variations between amplifiers of less than 20 percent, which allows an amplifier spacing equal to three dispersion lengths, which should be compared with the requirement for less than one dispersion length for conventional soliton systems.

Figure 6:
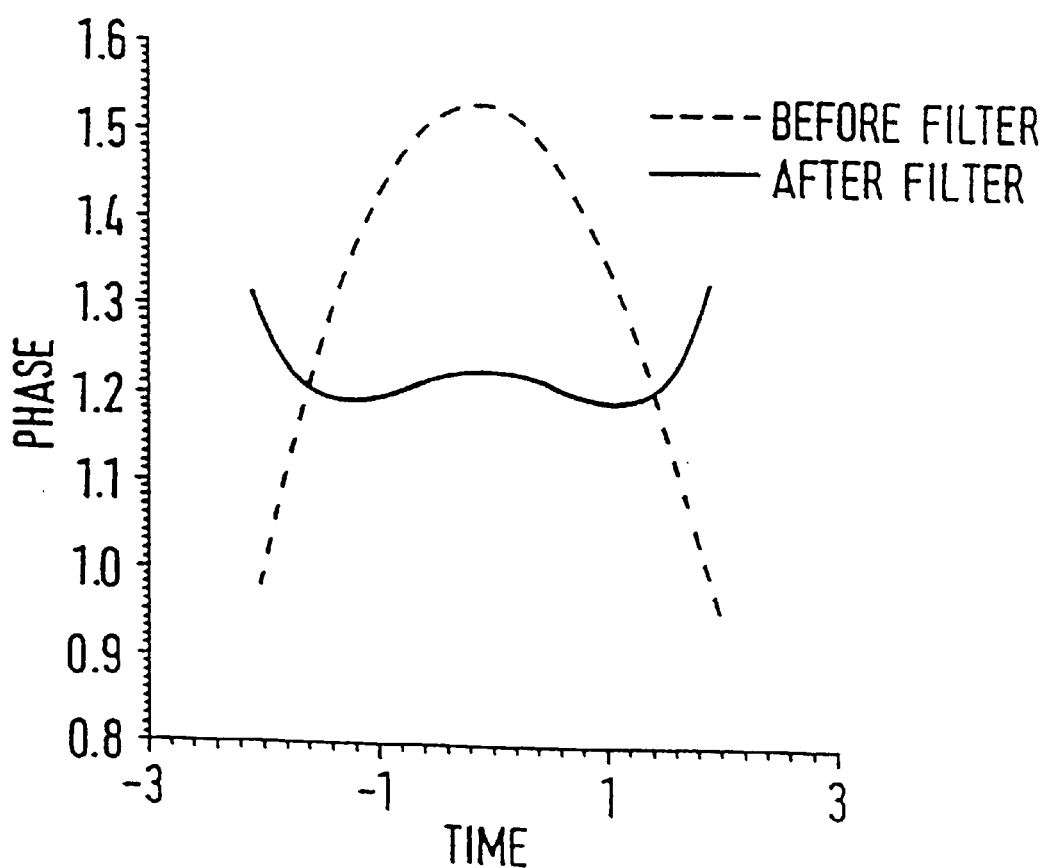
FIG. 6 is a schematic graph illustrating the soliton phase before and after CBLA.

FIG. 6 is a schematic graph illustrating the soliton phase before and after CBLA, and in fact shows the pulse phase before and after the chirping element 60. FIG. 6 indicates almost complete compensation of the loss-induced chirp.

It should be pointed out that similar soliton stability can be obtained for 20 dB loss between amplifiers but the chirp strength has to be increased.

For the discussions below, a distance will now be defined over which a soliton maintains its nonlinear properties as $z_n = N^2/\Gamma$, where $\Gamma$ is optical loss over one dispersion length and N is the order of the input soliton. (This definition of such a nonlinear length is close to that given in [4] in the context of applicability of perturbation methods to the Nonlinear Schrodinger Equation with loss). In order to minimize dispersion broadening within the remaining length of fibre between amplifiers in which the soliton propagates as a linear pulse one has to apply a dispersion-compensation technique. The amount of dispersion (in normalized units) which has to be compensated is equal to 0.5 $(z_a - z_n)$ (for values of $z_n \leq z_a$).

Deliberate pulse counter-chirping results in an effective reduction of the fibre dispersion by an amount $\delta = \alpha$. Making both quantities equal to each other provides a simple relation between amplifier spacing, fibre loss and required strength of chirp i.e. $2\alpha = (z_a - N^2/\Gamma)$. In the present case $\Gamma = 0.77$ for 10 dB loss and 1.54 for 20 dB, which gives theoretical values of the required counter-chirp strength of 0.56 and 0.82 respectively, which is close to that found by numerical calculations (0.59 and 0.83 respectively). Thus in the present embodiments partial dispersion compensation is used.

Using CBLA, there are four important parameters which can be adjusted to alter the soliton stability. These are (i) filter bandwidth, (ii) amplifier gain, (iii) amplifier spacing and (iv) chirp strength. The computer simulations described above indicate that the filter bandwidth should preferably be 3 to 10 times wider than that of the solitons, while the chirp strength depends on the amplifier spacing and the loss between amplifiers and should preferably be chosen in accordance with the expression:

$$\alpha = 0.5 z_a (1 - (1 + 0.02\Gamma)^2 / 0.23\Gamma)$$

where $z_a$ is the amplifier spacing in dispersion lengths (i.e. $z_a = z/z_d$) and $\Gamma$ is the optical loss between amplifiers in dB. For example, if the amplifier spacing is equal to three dispersion lengths then a system with 10 dB loss between amplifiers requires a counter-chirp strength equal to 0.6, while in a system with 20 dB loss one has to impose counter-chirp over the solitons with strength equal to 0.83. In other words, in the first case we compensate 40% of the fibre dispersion and in the second case 55%.

It should be understood that increasing the amplifier spacing results in an increase of the amount of non-soliton component emitted by the propagating solitons, and this amount depends not only on the physical distance between amplifiers but also on the soliton pulsewidth and the fibre dispersion and our computer simulations reveal that for stable soliton propagation the following inequality should be satisfied $$z_a = z/z_d \leq 3 \text{ or } z \leq 2\tau^2/(D\lambda^2)$$

where z is amplifier spacing in km, $\tau$ is the soliton pulsewidth in ps, D is the fibre dispersion in ps/nm·km and $\lambda$ is the operating wavelength in micrometers.

It should also be understood that the chirp strength in physical units depends on the actual pulsewidth and should be chosen in accordance with the expression $$\alpha_{ph} = \alpha \tau^2/4$$

where $\alpha_{ph}$ is a physical chirp strength in ps², $\alpha$ is a normalized chirp strength given by Eq.(1) and $\tau$ is the soliton pulsewidth in ps.

Thus in contrast to paper [8] where a length of dispersion compensated fibre was employed to make zero total dispersion (and reduce timing jitter) the present embodiments provide a partial dispersion compensation in soliton transmission systems by means of counter-chirped amplification which can lead to substantial improvement of soliton stability and allows a reduction in the pulsewidth, an extension of the amplifier spacing and an increase in transmitted bit rate.

Figure 7:
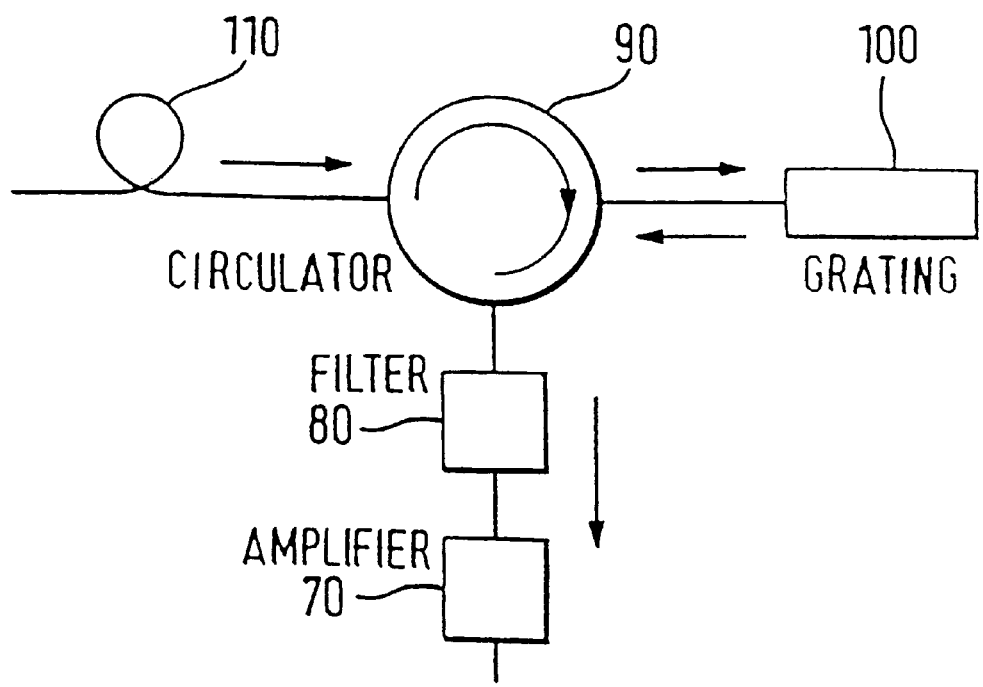
FIG. 7 is a schematic diagram of a chirped bandwidth-limited amplifier.

One possible implementation of this technique is shown in FIG. 7. An amplifier unit consists of an optical amplifier 70, a narrow-band optical filter 80, an optical circulator 90 and a chirped fibre grating 100. The solitons, after propagation along a length of optical fibre 110, come through the optical circulator, reflect from the chirped grating (3) to compensate the loss-induced chirp and then, after passing through the optical circulator and the bandpass optical filter, experience amplification in the fibre amplifier.

For example, in a 20 Gb/sec system based on dispersion-shifted fibre with dispersion 0.5 ps/nm km (soliton pulsewidth is 10 ps and the mark-space ratio is 1:5) then the application of the present technique results in an increase of the amplifier spacing up to 100 km (from a typical 40 km without CBLA). The required chirp strength is 14 ps². A 40 Gb/sec system requires a pulsewidth of 5 ps, the amplifier spacing can be extended up to 50 km and the chirp strength is 4 ps².

Another relevant example of the application of the present technique is a system based on standard non-dispersion-shifted telecom fibre with typically 17 ps/nm·km group velocity dispersion. In this case for a 10 Gb/sec system (pulsewidth 22 ps) the amplifier spacing can be extended to 25 km and the required chirp strength is around 40 ps².

Figure 8:
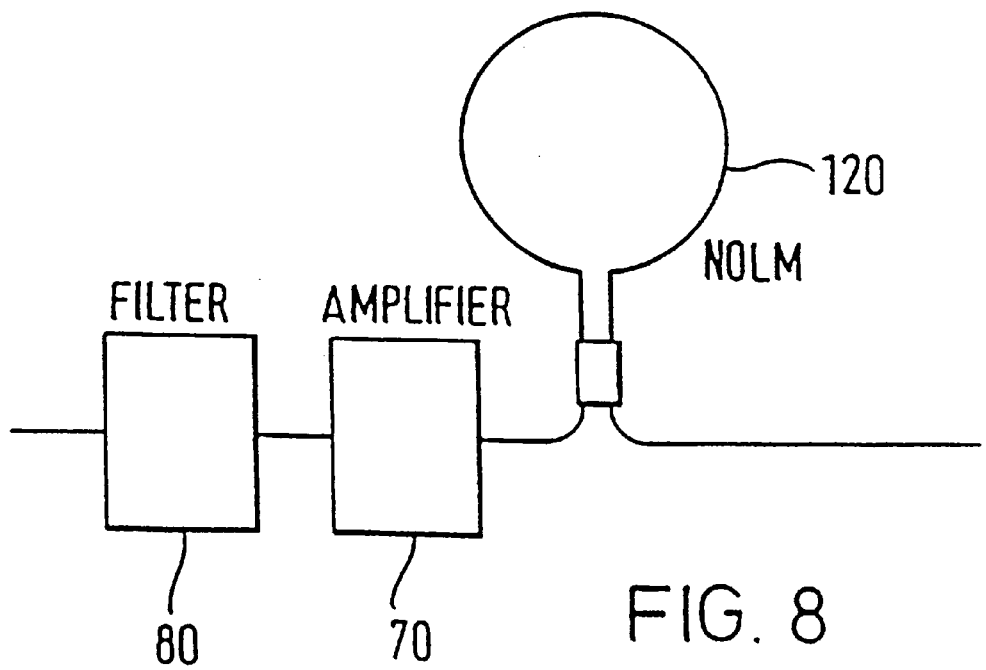
FIG. 8 is a schematic diagram of another embodiment of a chirped bandwidth-limited amplifier.

Another possible embodiment of a CBLA is shown in FIG. 8 where an optical amplifier 70 and bandpass filter 80 are followed by a non-linear amplifying loop mirror (NOLM) 120 which provides the chirping action.

Figure 9:
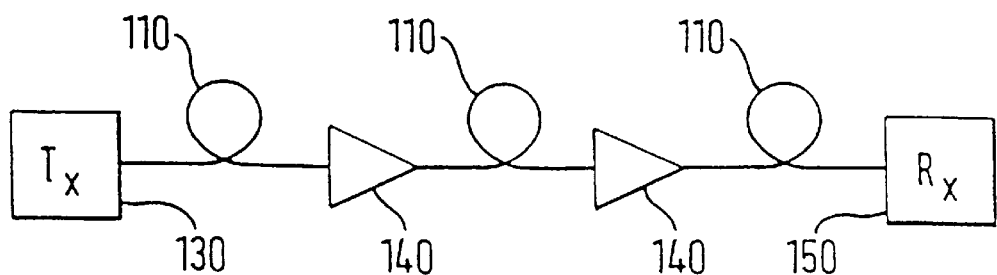
FIG. 9 is a schematic diagram of an optical communication apparatus using a CBLA.

FIG. 9 is a schematic diagram of an optical communication apparatus comprising an optical transmitter 130 for generating an optical signal comprising successive substantially soliton-like pulses, optical fibre links 110, CBLAs 140 and an optical receiver 150.

It should be emphasized that the order of components within the amplifier unit (i.e. amplifier, filter and chirping device) can be arbitrary and depends on the particular configuration of the unit. Moreover, in some cases two or more components can be assembled in one multifunctional unit, which produces the same action i.e. chirped bandwidth-limited amplification.

It should be also understood that there are several further implementations of the basic idea within the scope of the invention, some of which are outlined as follows.

Any of the separately known techniques for producing chirp can be incorporated into the amplifier unit. These can include, for example, the use of semiconductor pre-amplifiers, fibres or planar waveguides with a high nonlinear refractive index.

While the discussion above refers to the solitons at a wavelength of 1550 mn, the concept of soliton transmission control is applicable to any soliton-transmission system operating, for example, at 1300 nm.

The results of soliton transmission experiments using different methods for soliton control are summarised in Table 1 below. The present technique not only allows the use of the shortest pulses but also offers the highest value of the product of the amplifier spacing and the bit rate. The technique also allows the upgrade of already existing transmission systems to 10 Gb/sec bit rate.

TABLE 1

| Method | Dispersion, ps/nm · km | Pulsewidth, s | Amplifier Spacing, km | Dispersion Length, km | Distance, $10^3$ km | Bit Rate, Gb/sec |
|---|---|---|---|---|---|---|
| Active Modulation, exprm., [2] | 0.4 | 6 | 33 | 25 | 125 | 20 |
| Sliding Filter, exprm., [3] | 0.45 | 16 | 26 | 160 | 25 | 15 |
| Nonlinear Gain/Loss, theor., [5] | 0.45 | 15 | 100 | 140 | 9 | 10 |
| Present techniques | 0.4 | 5 | 50 | 17 | 10 | 40 |
| Present techniques | 0.4 | 10 | 100 | 70 | 10 | 20 |
| Present techniques | 17 | 22 | 25 | 8 | 2 | 10 |

Some further features of this type of data transmission are presented below with reference to FIGS. 10a, 10b, 11a, 11b and 12.

These results are based on numerical modelling of a transmission system comprising a length of optical fibre and an amplifier unit. Propagation in the fibre was modelled using the so-called split-step Fourier method to solve the non-linear Schrodinger equation (NSE). The amplifier spacing in the model was selected to be 100 km, the fibre loss 0.2 dB/km, the fibre dispersion 0.17 ps/nm·km and the third order dispersion 0.07 ps/nm·km.

Each amplifier unit was modelled as a lumped amplifier and a linearly chirped fibre grating capable of compensating for 60% of the fibre span dispersion. The reflection curve of a typical chirped fibre grating has a flat top and steep shoulders, and therefore a Butterworth-type shape was used to describe the spatial dependence of the fibre grating reflectivity:

$$R(\omega) = \frac{1}{1 + i\left(\frac{2\omega}{B}\right)^{2m}}$$

where w is the optical frequency, B is the spectral bandwidth of the grating and m is the order of the Butterworth filter.

To model a 40 Gbit/s transmission system a 4.5 ps pulsewidth and a 25 ps pulse separation were used. The additional gain at each grating arising from its filtering properties was 0.12 dB for m=3, while a Fabry-Perot shape (m=1) incurs an excess gain of 0.4 dB.

Figure 10A:
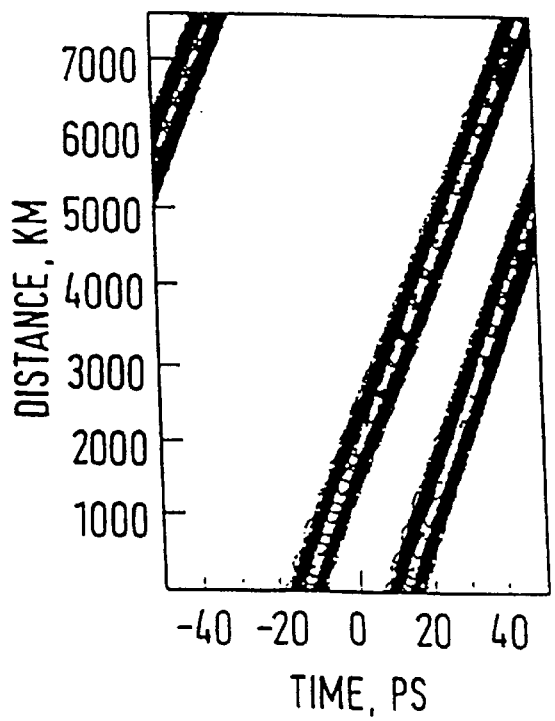
FIG. 10a is a schematic contour map illustrating pulse pair propagation in a 40 Gbit/s system with partial dispersion compensation and spectral filtering.
Figure 10B:
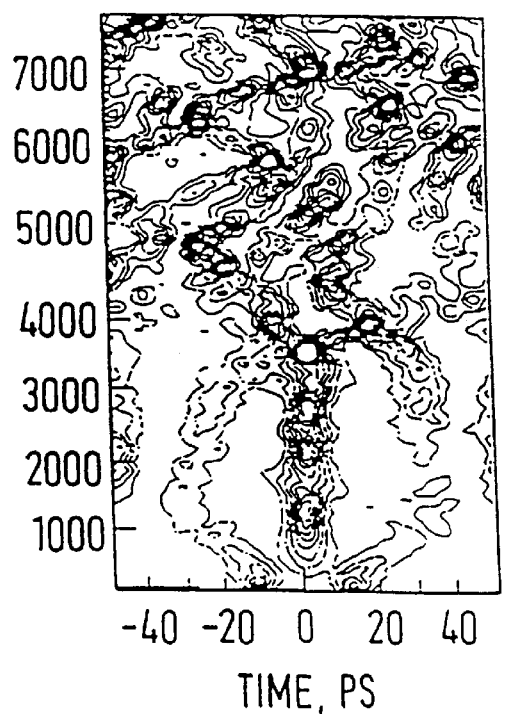
FIG. 10b is a schematic contour map illustrating pulse pair propagation in a 40 Gbit/s system without partial dispersion compensation and spectral filtering.
Figure 11A:
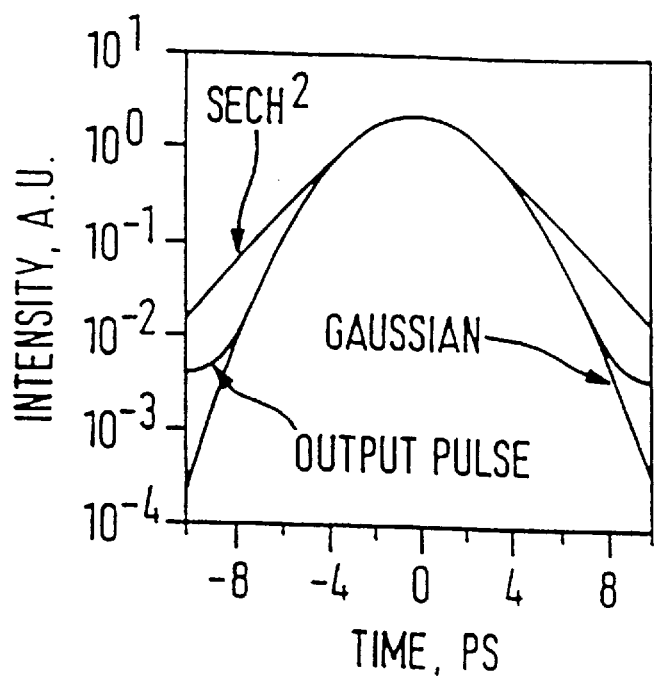
FIG. 11a is a schematic graph illustrating the temporal shape of an optical pulse immediately after passing through an amplifier.
Figure 11B:
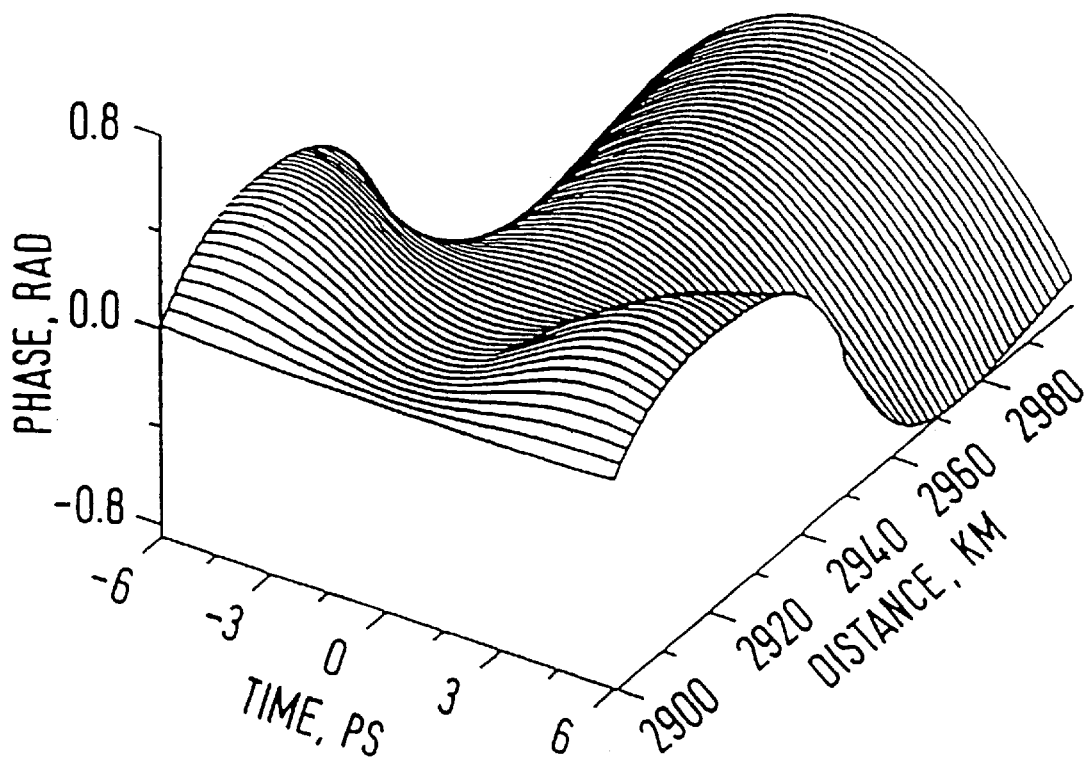
FIG. 11b is a schematic graph illustrating pulse phase variation between amplifiers.

FIG. 10a is a schematic contour map of pulse pair propagation obtained using this model which indicates stable soliton propagation over (ideally) unlimited distance. FIG. 10b is a similar map in the absence of chirp compensation.

These data illustrate that in a system with partial dispersion compensation the fraction of the emitted non-soliton component becomes very low which results in only a weak non-linear coupling between the soliton and non-soliton components; the soliton remains essentially intact over (ideally) unlimited distances.

In a paper published after the first priority date of this application [10], it was pointed out that the pulse shape in such a system is not the hyperbolic secant of regular solitons but is gaussian. The same feature was observed in the present model, as illustrated schematically in FIG. 11a, which shows the pulse's temporal shape immediately after amplification. A possible explanation for such an unusual pulse shape is that, having steeper wings, the gaussian pulses attain higher self-phase modulation in the first part of the fibre span, allowing them to minimise or reduce the fraction of the emitted non-soliton component. The phase variation between amplifiers is illustrated schematically in FIG. 11b.

An inevitable effect of incoherent amplification is that each amplifier adds noise to the signal. Since the system is nonlinear, the spontaneous emission noise changes not only the soliton amplitudes but also the carrier frequencies, which results in so-called pulse walk-off (Gordon-Haus jitter). In-line frequency filters have been shown to be powerful means of reducing Gordon-Haus jitter [11]. However, the strength of the filters is limited by the growth of cw radiation close to the filter central frequency, and so to minimise or reduce this effect the use of Butterworth filters has been suggested [12]. In this context the application of fibre gratings as chirping devices allows the signal to noise ratio of the system to be improved with in-line filters, while retaining the same suppression of the pulse walk-off.

Figure 12:
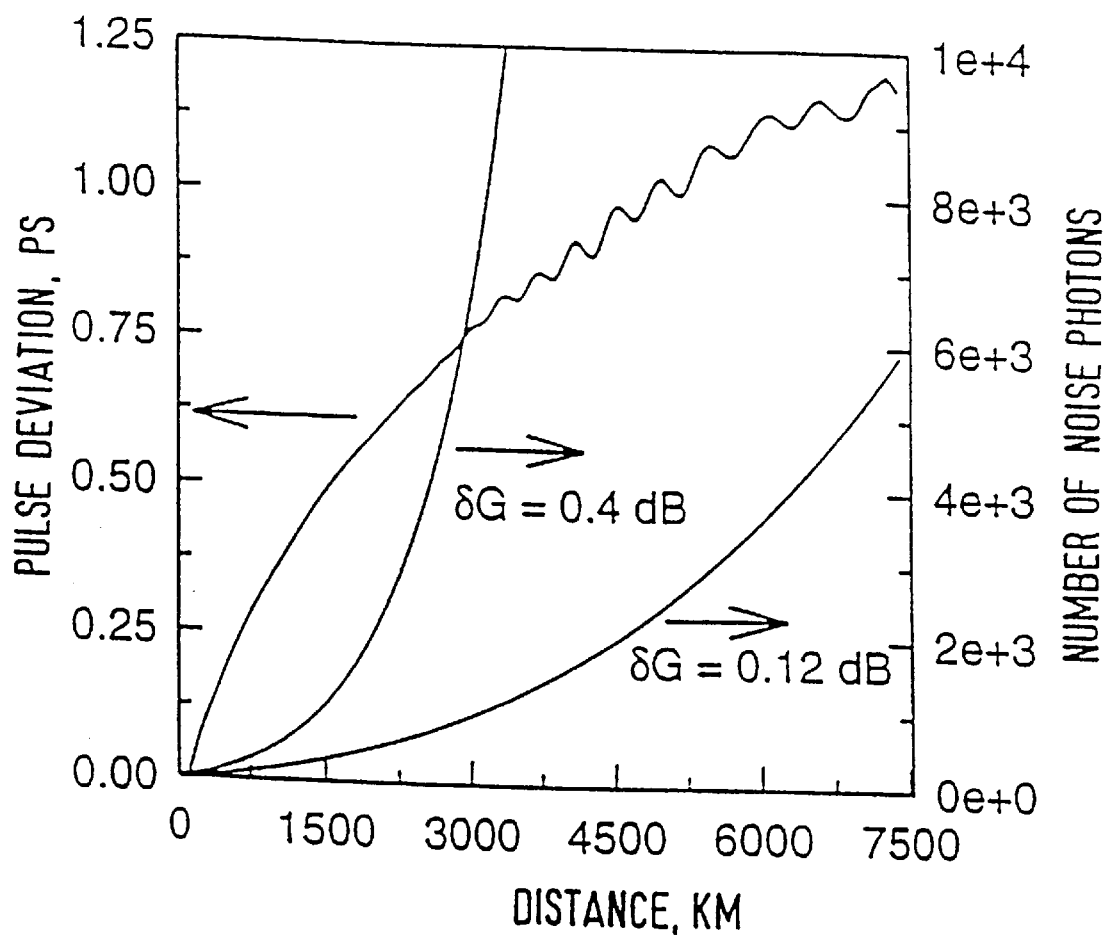
FIG. 12 is a schematic graph illustrating timing jitter and number of noise photons as a function of distance.

FIG. 12 illustrates the standard deviation of the pulse position when each amplifier introduces to the pulses a random frequency shift with variance [13]

$$\langle \bar{\Omega}^2 \rangle = \frac{(2\pi c)^2 h n_2 \eta_{sp}(G-1)}{3\tau D \lambda^4 A_{\text{eff}} P/P_f}$$

where $A_{\text{eff}}$ is the effective fibre core area, $\eta_{sp}$ is the noise factor of the amplifier and $P/P_f$ is the ratio of launched peak power to the fundamental soliton peak power (being equal to 2.5 in the present model).

After 7500 km propagation the standard deviation of the jitter is 1.24 ps. (For a bit error rate of $10^{-9}$ the pulse jitter should be less than $25/(3\times6.1)=1.36$ ps).

The total number of spontaneously emitted photons within the time window T can be calculated with the use of equation 6.18 from [11]:

$$n_{noise} = 2z\Gamma f \eta_{sp} \frac{\exp(\delta g z)}{\sqrt{3\pi} \, \delta gz} D\left(\sqrt{\delta gz}\right) \frac{T}{\tau}$$

where Γ is the fibre loss, $f=(G-1)^2/(G\ln G)$ is the noise enhancement factor, D(x) is the Dawson function and δg is the excess filter loss.

FIG. 12 also illustrates the growth of noise photons in a system with excess gain 0.4 dB (a conventional Fabry-Perot filter) and 0.12 dB (a Butterworth filter with m=3). Since an average 4.5 ps soliton in the modelled system comprises $10^6$ photons then for an SNR of 20 dB the use of conventional filters permits propagation free of bit errors for 3500 km, whereas for Butterworth-type filters the distance is more than 7500 km.

In summary therefore, embodiments of the invention provide an optical amplifier for amplifying substantially soliton-like optical pulses, the amplifier comprising a counter-chirping device and a bandwidth-limiting optical filter.

PUBLICATION REFERENCES

1. Kubota, H. et al: "Soliton transmission control in time and frequency domains", IEEE J. Quantum Electron., 29, 2189, (1993)

2. Widdowson, T. et al, Electronics Letters, 30, 1866, (1994)
3. Mollenauer, L. F. et al: "The sliding-frequency guiding filter: an improved form of soliton jitter control", Opt. Lett., 17, 1575, (1992)
4. Matsumoto, M. et al: "Numerical study of the reduction of instability in bandwidth-limited amplified soliton transmission", Opt. Lett., 18, 897, (1993)
5. Atkinson, D. et al, Opt. Lett., 19, 1514, (1994)
6. Blow, K. J. et al: "The asymptotic dispersion of soliton pulses in lossy fibres", Optica Communications, 52, 367, (1985)
7. Desem, C. et al: "Effect of chirping on soliton propagation in single-mode optical fibres", Opt. Lett. 11, 248, (1986)
8. Suzuki, M. et al: "Timing jitter reduction by periodic dispersion compensation in soliton transmission", OFC'95, paper PD20, (1995)
9. Edagawa, N. et al: "20 Gbit/s 8100 km straight-line single-channel soliton-based Rz transmission experiment using periodic dispersion compensation", ECOC '95, paper Th.A3.5 (1995)
10. Smith, N. J. et al: "Enhanced power solitons in optical fibres with periodic dispersion management" Electron Lett, 1996, 32, 54
11. Mecozzi, A., "Long distance soliton transmission with filtering, JOSA B, 1992, 10, 2321
12. Mecozzi, A., "Soliton transmission control by Butterworth filters" Opt Lett, 1995, 20, 1859
13. Marcuse, D., "An alternative derivation of the Gordon-Haus effect", J Lightwave Techn, 1992, 10, 273

What is claimed is:

1. Optical communication apparatus comprising:
   a dispersive optical fibre;
   an optical transmitter for launching optical pulses into the optical fibre at a pulse intensity sufficient to provide non-linear dispersion compensation during propagation through a first length of the fibre;
   a series of amplifier units spaced along the fibre by a distance greater than the first length of the fibre, each amplifier unit comprising a counter-chirping device for substantially compensating for dispersion of the optical pulses in a second length of the fibre extending between the first length and the amplifier unit, and an amplifier for launching amplified optical pulses into the optical fibre at a pulse intensity sufficient to provide non-linear dispersion compensation during propagation through a further first length of the fibre.

2. Apparatus according to claim 1, in which the chirp strength α of the counter-chirping device is substantially given by:

$$\alpha = 0.5 z_a (1-(1+0.02\Gamma)^2/0.23\Gamma)$$

where $z_a$ is the fibre length as a multiple of a dispersion length of the fibre and $\Gamma$ is the optical loss of the fibre in decibels.

3. Apparatus according to claim 2, in which the counter-chirping device is a transmission device.

4. Apparatus according to claim 1, in which the launched pulses are soliton-like pulses.

5. Apparatus according to claim 4, in which each amplifier unit comprises a band-limiting optical filter.

6. Apparatus according to claim 5, in which the band-limiting filter has a bandwidth of between about three times and about ten times the optical bandwidth of the soliton pulses launched into the fibre.

7. Apparatus according to claim 6, in which the counter-chirping device is a transmission device.

8. Apparatus according to claim 4, in which the counter-chirping device is a transmission device.

9. Apparatus according to claim 5, in which the counter-chirping device is a transmission device.

10. Apparatus according to claim 1, in which the counter-chirping device is a reflector coupled to an optical signal path along the fibre by an optical circulator.

11. Apparatus according to claim 10, in which the counter-chirping device comprises one or more chirped gratings.

12. Apparatus according to claim 10, in which the counter-chirping device comprises a non-linear loop mirror.

13. Apparatus according to claim 10, in which the counter-chirping device comprises a semiconductor amplifier having a non-linear refractive index.

14. Apparatus according to claim 1, in which the counter-chirping device is a transmission device.

15. Apparatus according to claim 14, in which the counter-chirping device comprises a length of a fibre having a non-lineal refractive index.

16. Apparatus according to claim 14, in which the optical fiber is a first optical fiber, and the counter-chirping device comprises a length of a second optical fibre connected in series with the first optical fibre, the second optical fibre having a dispersion of opposite sense to that of the first optical fibre.

17. Apparatus according to claim 14, in which the counter-chirping device comprises a semiconductor amplifier having a non-linear refractive index.

18. Apparatus according to claim 1, wherein the counter-chirping device is arranged after the second length of fibre as a post-compensator to compensate for dispersion in the second length of the fibre.

19. Apparatus according to claim 1, wherein the counter-chirping device is arranged after the second length of fibre as a pre-compensator to compensate for dispersion in a further second length of the fibre arranged after said further first length of the fibre.

20. A method of optical communication comprising:
   launching optical pulses into a dispersive optical fibre at a pulse intensity sufficient to provide non-linear dispersion compensation during propagation through a first length of the fibre;
   using a counter-chirping device for substantially compensating for dispersion of the optical pulses in a second length of the fibre extending between the first length and a respective one of a plurality of amplifier units spaced along the fibre by a distance greater than the first length of the optical fibre; and
   using the respective amplifier unit for launching amplified optical pulses into the optical fibre at a pulse intensity sufficient to provide non-linear dispersion compensation during propagation through a further first length of the fibre.

21. Optical communication apparatus comprising;
   a length of optical fibre having a characteristic amount of linear dispersion, an input end and an output end;
   an optical transmitter connected to launch optical pulses into the input end of the optical fibre at a pulse intensity sufficient to provide dispersionless non-linear soliton propagation of the optical pulses over a first part of the optical fibre and dispersive linear propagation of the optical pulses over a subsequent second part of the optical fibre; and
   a dispersion compensator arranged to provide a compensating amount of linear dispersion equal to a fraction of the characteristic amount of linear dispersion of the optical fibre, wherein the fraction is matched to compensate for the dispersive linear propagation of the optical pulses in the second part of the optical fibre.

22. The apparatus of claim 21, wherein the fraction is in the range 40 to 60%.

23. The apparatus of claim 21, wherein the dispersion compensator is arranged at the output end of the optical fibre as a post-compensator.

24. The apparatus of claim 21, wherein the dispersion compensator is arranged at the input end of the optical fibre as a pre-compensator.

25. A method of optical communication comprising:

providing a length of dispersive optical fibre having a characteristic amount of linear dispersion, an input end and an output end;

launching optical pulses into the input end of the optical fibre at a pulse intensity to provide dispersionless non-linear soliton propagation of the optical pulses over a first part of the optical fibre and dispersive linear propagation of the optical pulses over a subsequent second part of the optical fibre; and applying a compensating amount of linear dispersion to the optical pulses equal to a fraction of the characteristic amount of linear dispersion of the optical fibre, wherein the fraction is matched to compensate for the dispersive linear propagation of the optical pulses in the second part of the optical fibre.

26. The apparatus of claim 25, wherein the fraction is in the range 40 to 60%.

27. The apparatus of claim 25, wherein the compensating amount of linear dispersion is applied at the output end of the optical fibre to provide post-compensation.

28. The apparatus of claim 25, wherein the compensating amount of linear dispersion is applied at the input end of the optical fibre to provide pre-compensation.

* * * * *